Apr. 24, 1923.
L. WERLE
1,452,901
STEERING LOCKING DEVICE
Filed March 29, 1921
2 Sheets-Sheet 1
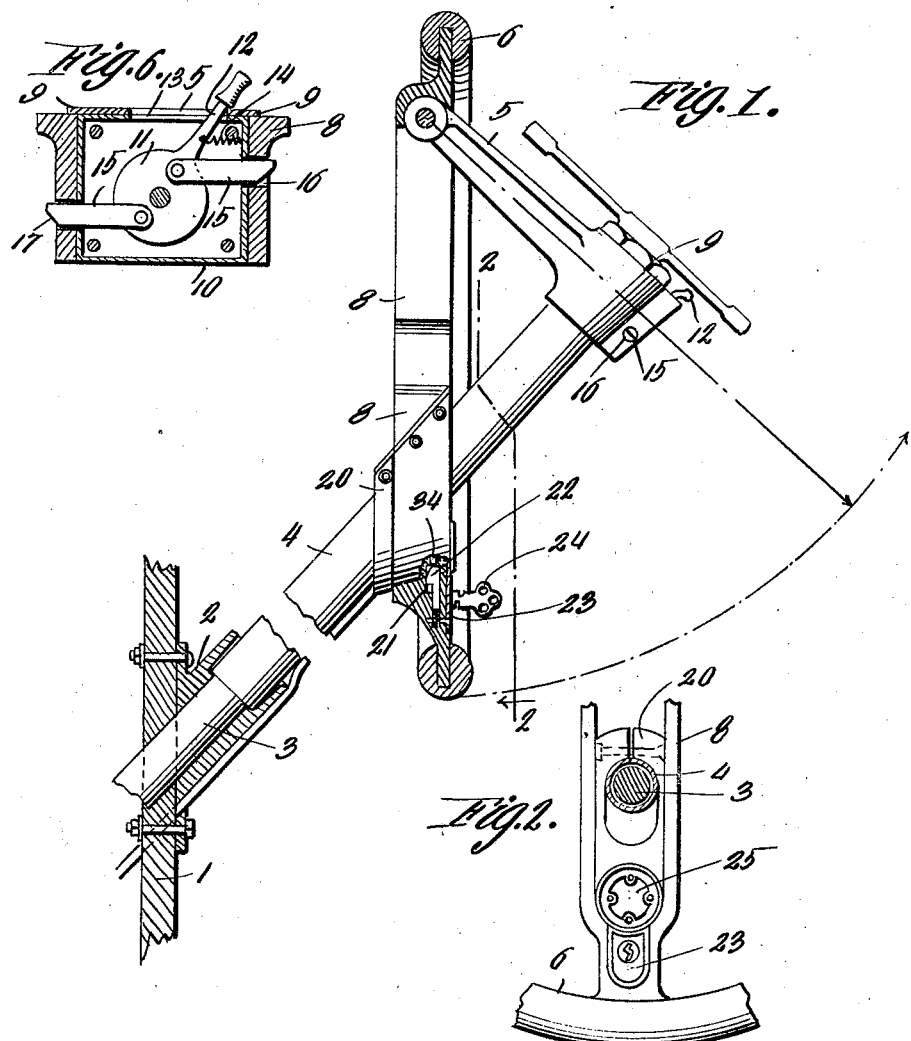
INVENTOR.
LUDWIG WERLE
BY
ATTORNEY.

Apr. 24, 1923.
L. WERLE
1,452,901
STEERING LOCKING DEVICE
Filed March 29, 1921
2 Sheets-Sheet 2
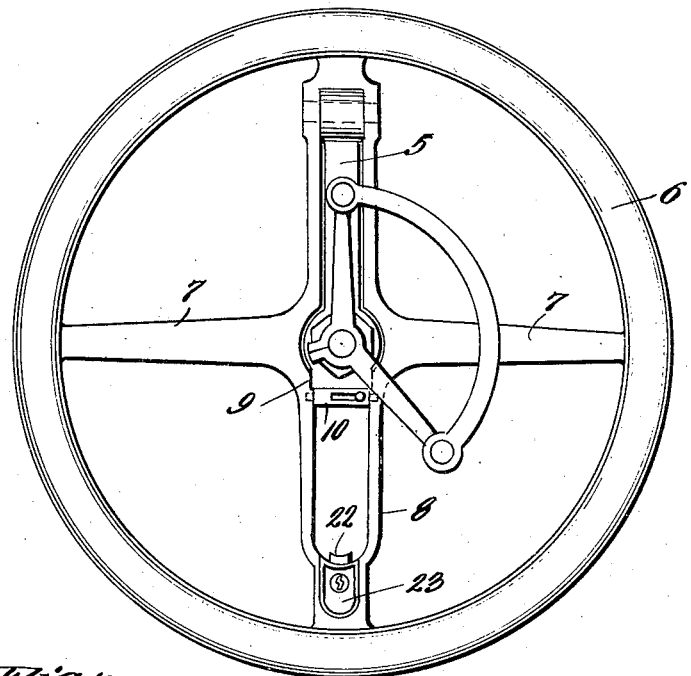
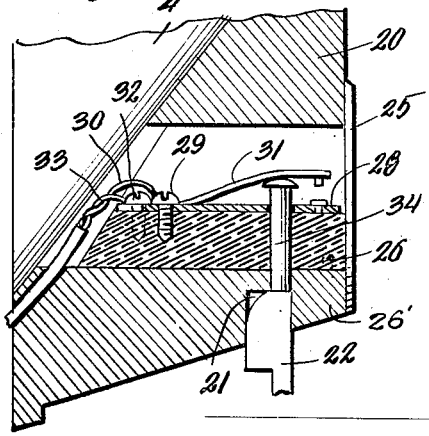
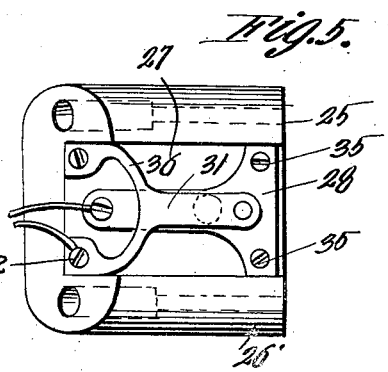
LUDWIG WERLE INVENTOR.
WITNESSES
BY
ATTORNEY.

Patented Apr. 24, 1923.

1,452,901

UNITED STATES PATENT OFFICE.

LUDWIG WERLE, OF STURGEON BAY, WISCONSIN.

STEERING LOCKING DEVICE.

Application filed March 29, 1921. Serial No. 456,766.

*To all whom it may concern:*

Be it known that I, LUDWIG WERLE, a citizen of Germany, residing at Sturgeon Bay, in the county of Door and State of Wisconsin, have invented certain new and useful Improvements in a Steering Locking Device, of which the following is a specification.

This invention relates generally to locking devices for steering mechanisms and particularly those of the collapsible type.

The principal object of the invention is to provide means whereby the steering wheel itself may be locked in an inoperative position so as to prevent the unauthorized manipulation thereof, locking means also being provided for holding same securely in an operative position.

Another object of the invention is to provide means in conjunction with the locking mechanism that holds the steering wheel in an inoperative position which will break the circuit of the ignition system thus preventing the engine from being started.

A still further object of the invention is to generally improve upon locking mechanisms of this character by providing a device which will be of extremely simple, durable and inexpensive construction, one which is efficient and reliable in operation, and well adapted to the purpose for which it is designed.

With these and numerous other objects in view, the invention resides in certain novel features of construction and the combination and arrangement of parts as will be hereinafter fully described and claimed.

In the drawing:—

Figure 1 is a fragmentary sectional view taken through the steering mechanism showing the steering wheel in an inoperative position, Figure 2 is a section taken on the line 2—2 of Figure 1 looking in the direction of the arrow, Figure 3 is a plan view of the steering wheel in an operative position, Figure 4 is an enlarged sectional view taken through the circuit closing mechanism used in conjunction with this invention, Figure 5 is a plan view thereof, and Figure 6 is a sectional view taken through the locking mechanism which holds the steering wheel in an operative position.

Referring to the drawing in detail it will be seen that 1 designates the usual dashboard which is provided with the bracket 2 for receiving the steering column 3 which passes through the usual casing 4. This casing 4 will be fixed to the bracket 2 in any suitable manner so as to prevent the turning thereof. An arm 5 is suitably keyed to the steering column 3 and may be of any preferred construction. The collapsible steering wheel 6 is pivotally mounted on the arm 5 and preferably consists of the solid spokes 7 which extend diametrically from each other and the slotted spokes 8 which extend at right angles to the spokes 7. It will be noted in Figure 3 that the arm 5 is pivotally mounted on the slotted spoke 8.

This arm 5 at its inner end is provided with the shoulders 9 which act as stops for abutting the spokes of the steering wheel 6 when same is being placed in an operative position. A locking mechanism indicated generally at 10 is mounted in a suitable casing carried at the inner end of the arm 5. A wheel 11 is mounted in the casing and is operated by the lever 12 which extends through the slot 13 and will terminate immediately below the usual throttling mechanism mounted on the steering column. A spring 14 is attached to the lever 12 and holds same in its locking position. A pair of bolts 15 are slidable through apertures provided in the casing and are adapted to penetrate through the openings 16 in the spoke 8 of the wheel 6. When the lever 12, as shown in Figure 6, is moved to the left these sliding bolts 15 will be drawn in out of engagement with the openings 16 and thus the steering wheel 6 will be allowed to drop to an inoperative position. It will also be noted that these bolts 15 are beveled at 17 so that as the steering wheel 6 is being moved to its operative position the spoke 8 will engage the bolts 15 at their beveled portions and force same inwardly and as soon as the spoke 8 abuts the shoulders 9 these bolts 15 will be forced through the openings 16 and thus securedly hold the steering wheel 6 in an operative position. A block 20 is secured to the casing 4 intermediate its ends and will be received in the slot provided in the spoke 8 when the steering wheel 6 is in an inoperative position as shown in Figure 1. This block 20 is provided with an opening 21 for receiving the latch 22 of the lock 23. This latch 22 is preferably of the spring pressed type and will be forced into the opening 21 as soon as the steering wheel 6 is placed in an inoperative position. The lock 23 may be of any preferred construction and is preferably controlled by a key 24 which will be carried by the operator of the machine.

A switch indicated generally at 25 includes a block 26' which is preferably constructed so as to include the switch base 26 which is formed of an insulating material having a groove 27 in one face thereof. In the bottom of the groove 27 is positioned a plate 28 having a terminal 29 for receiving the electrical wire 30. A contact spring 31 is positioned on the plate 28 and insulated therefrom and is provided with a terminal 32 so as to be connected with the electrical wire 33. These wires 30 and 33 control the ignition circuits. The end of the spring contact 31 will normally be engaged with the plate 28 so as to keep the ignition circuits closed. A plunger 34 is suitably mounted in apertures provided in the plate 28, base 26, and block 26'. This plunger 34 is slidably mounted through these apertures so as to engage the spring contact 31 and the latch 22. When the latch 22 is inserted in the opening 21 it will force the plunger 34 inwardly and engage the spring contact 31 so as to separate the same from the plate 28 thus opening the circuit controlling the ignition system and thus stop the engine and keep the same in this condition until the latch 22 is removed from the opening 21 by the operator.

Referring especially to Figure 5 of the drawing it will be noted that the plate 28 is fixed to the base 26 by means of screws 35. This plate 28 is substantially T-shaped and the contact spring 31 has its ends bifurcated at 36 and is securedly held to the base 26 by the screws 32. This switch mechanism not only operates as an anti-starting device but stops the motor of the car as soon as the steering wheel 6 is placed in an inoperative position.

From the foregoing description, taken in connection with the accompanying drawing, the construction and operation of the invention will be readily understood without a more extended explanation. As numerous changes in form, proportion, and in the minor details of construction may be resorted to without departing from the spirit of this invention I do not wish to be limited to the construction herein shown and described other than as claimed.

Having thus described my invention what I claim as new is:

The combination of a steering column, a steering shaft and a steering wheel secured to said steering shaft so as to rotate therewith but adapted to tilt about an axis transverse of the axis of said shaft so that it may be tilted from a normal operative to an out of the way position; said steering column including a member disposed at the limit of tilting movement of the wheel, a switch in said member, means for normally holding the switch in a closed position, a spring pressed latch mounted on said wheel and engageable with said switch when said wheel is in an out of the way position for holding said switch open, said switch being located in the ignition system of a vehicle to which the steering wheel is attached.

In testimony whereof I affix my signature in presence of two witnesses.

LUDWIG WERLE.

Witnesses:
H. M. FERGUSON,
ESTHER SIMON.